Feb. 17, 1959 L. W. BARNES 2,873,767
MACHINE FOR MAKING SPRING CLIP CLOTHESPINS
Filed Dec. 14, 1953 8 Sheets—Sheet 1

INVENTOR.
Leslie W. Barnes
BY Kenway, Jenney, Witter
& Hildreth, Attys.

Feb. 17, 1959   L. W. BARNES   2,873,767
MACHINE FOR MAKING SPRING CLIP CLOTHESPINS
Filed Dec. 14, 1953   8 Sheets-Sheet 2

INVENTOR.
Leslie W. Barnes
BY Kenway, Jenney, Witter
& Hildreth, Attys.

Feb. 17, 1959   L. W. BARNES   2,873,767
MACHINE FOR MAKING SPRING CLIP CLOTHESPINS
Filed Dec. 14, 1953   8 Sheets-Sheet 3
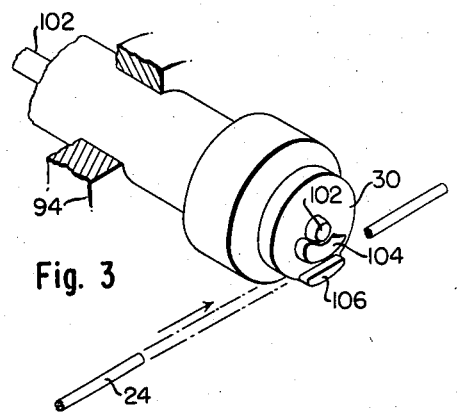
Fig. 3
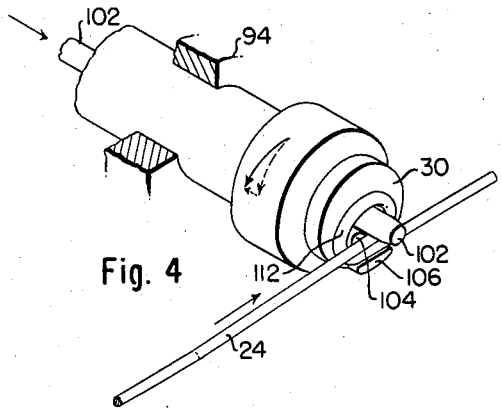
Fig. 4
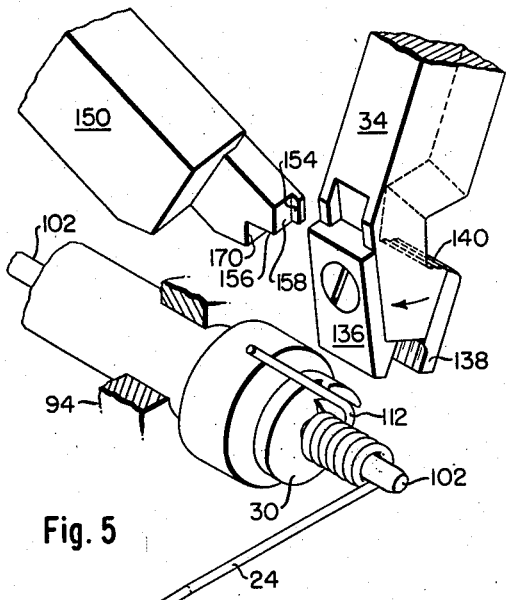
Fig. 5
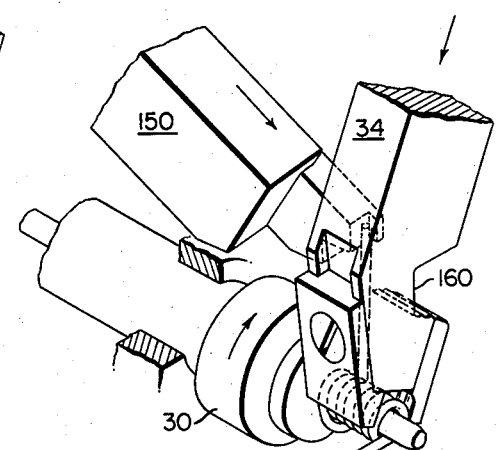
Fig. 6
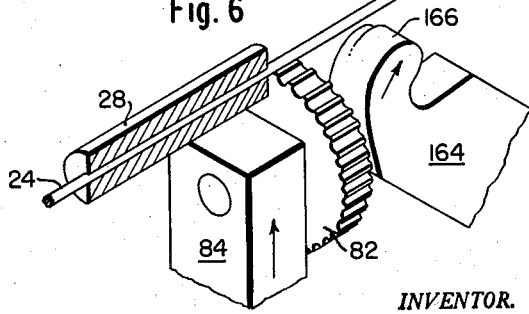
INVENTOR.
Leslie W. Barnes
BY Kenway, Jenney, Witter
& Hildreth, Attys.

Feb. 17, 1959   L. W. BARNES   2,873,767
MACHINE FOR MAKING SPRING CLIP CLOTHESPINS
Filed Dec. 14, 1953   8 Sheets-Sheet 4

INVENTOR.
Leslie W. Barnes
BY Kenway, Jenney, Witter
+ Hildreth, Attys.

Feb. 17, 1959 — L. W. BARNES — 2,873,767
MACHINE FOR MAKING SPRING CLIP CLOTHESPINS
Filed Dec. 14, 1953 — 8 Sheets-Sheet 5
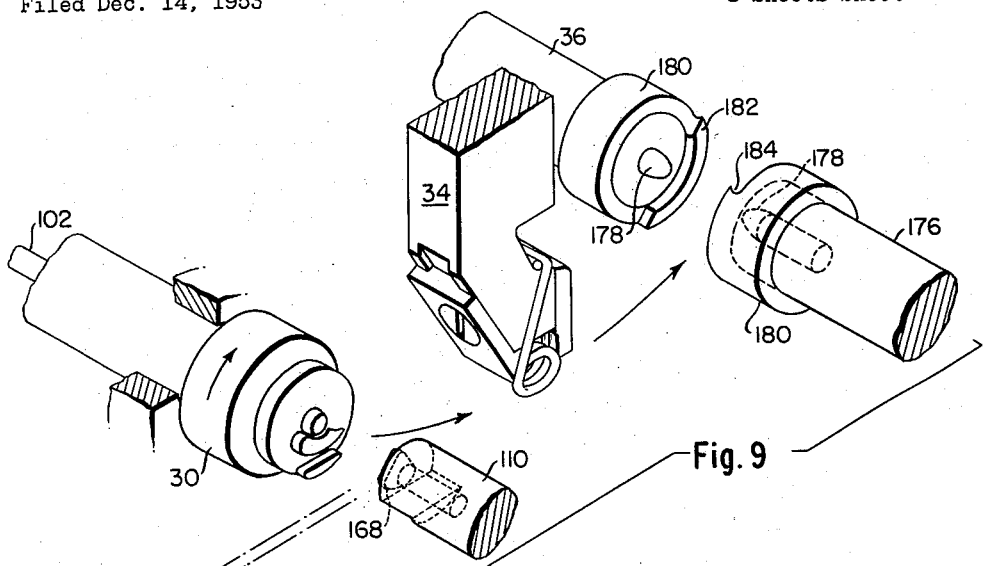
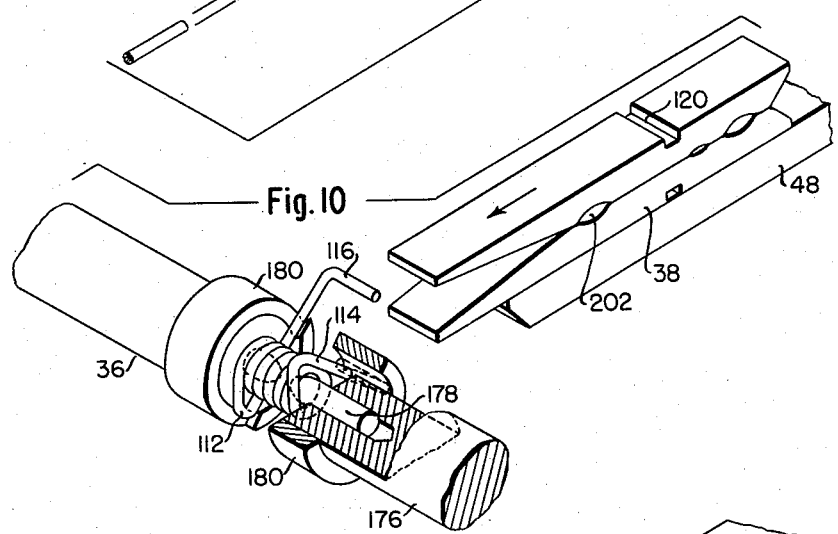
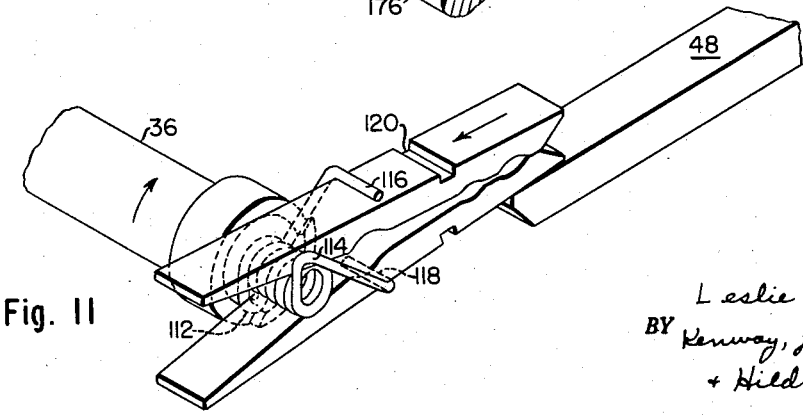
INVENTOR.
Leslie W. Barnes
BY Kenway, Jenney, Witter
& Hildreth, Attys.

Feb. 17, 1959 L. W. BARNES 2,873,767
MACHINE FOR MAKING SPRING CLIP CLOTHESPINS
Filed Dec. 14, 1953 8 Sheets-Sheet 6

INVENTOR.
Leslie W. Barnes
BY Kenway, Jenney, Witter
+ Hildreth, Attys.

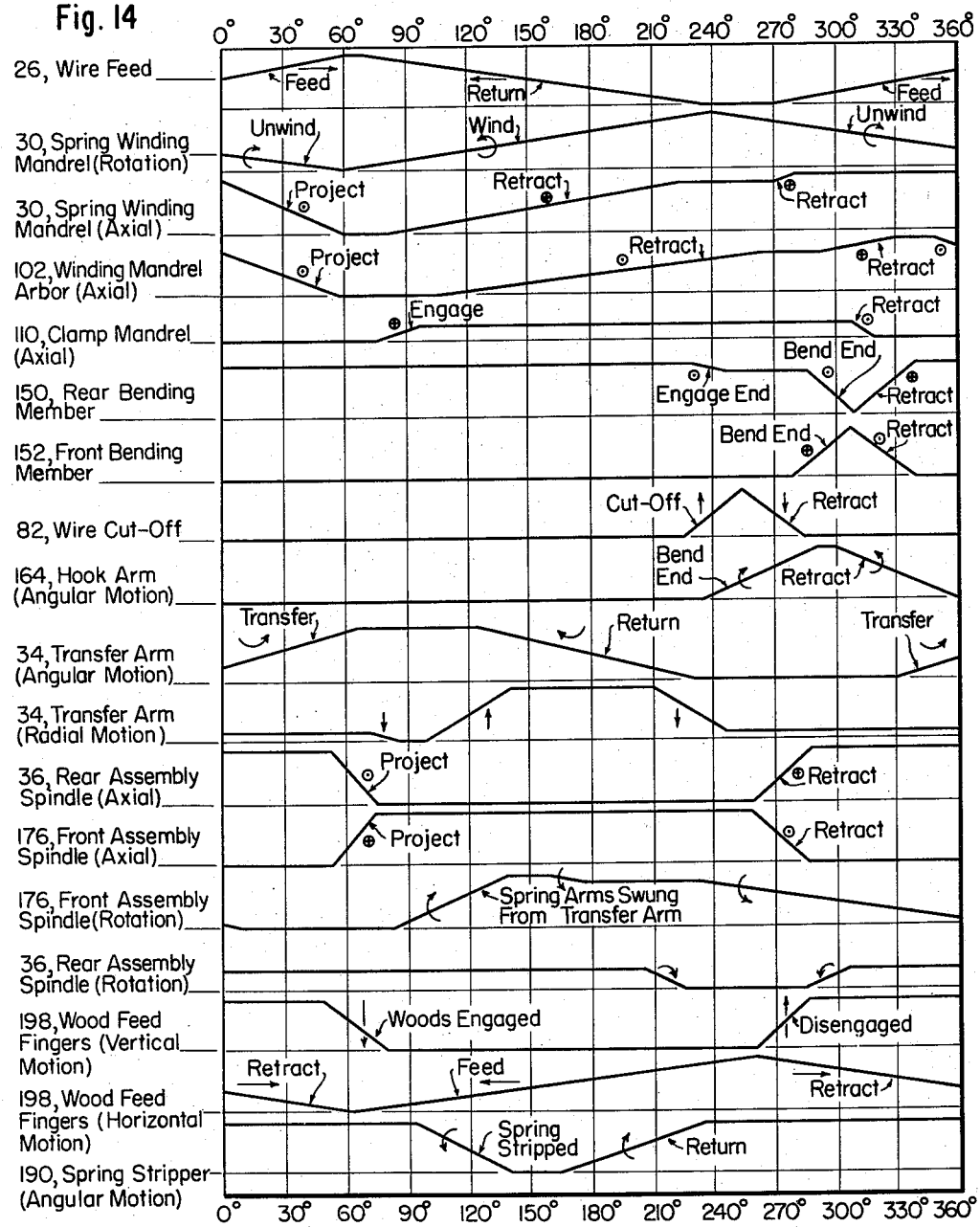

United States Patent Office 2,873,767
Patented Feb. 17, 1959

2,873,767

MACHINE FOR MAKING SPRING CLIP CLOTHESPINS

Leslie W. Barnes, Trumbull, Conn., assignor to Forster Mfg. Co., Farmington, Maine, a corporation of Maine Application December 14, 1953, Serial No. 397,911

10 Claims. (Cl. 140—1)

The present invention relates to clothespin making machinery and is concerned more particularly with a method and apparatus for making clothespins of the snap or spring clip type.

The assembly of the conventional spring clip clothespin has long presented a major problem. Customarily these clothespins are assembled by hand operation, in conjunction with a simple jig by which the preformed springs may be opened sufficiently to permit the woods to be forced into place by the operator. Attempts have been made to devise machinery for carrying out this operation automatically, but the problems involved in sorting and feeding the wire springs in view of their complex shape have proved of such difficulty as to render impractical a satisfactory automatic machine capable of rapid and sustained production.

It is therefore an object of the present invention to provide a machine by which spring clip clothespins may be assembled automatically and at relatively high rates of production.

More specifically, it is an object of the invention to provide a machine by which, in fully automatic fashion, the spring may be formed within the machine and thereafter immediately assembled with the previously shaped woods, thereby simplifying the handling and feeding of the wire springs.

Another object of the invention concerns the provision of a machine wherein the spring making and clothespin assembly operations are performed automatically according to a predetermined sequence of operation which permits an optimum design of spring for use in the snap type clothespin.

In accordance with these and other objects of the invention as will hereinafter appear, one of the features of the machine involves the provision of mechanism for manufacturing the spring at the first of two operating stations, after which the completed spring is transferred automatically to a second operating point where the woods are inserted to complete the clothespin.

More specifically, the machine of the present invention makes use of mandrel type spring forming means, operating in conjunction with an arm which serves as an anvil for certain of the spring forming operations, said arm being actuated in appropriate timed relation to the mandrels to operate as a transfer mechanism to carry the completed spring from the spring forming mandrels to the assembly station, at which station the completed spring is positioned and opened as the advancing woods are brought to registering position for completion of the pin.

Other features of the invention will be apparent from the following description, taken in conjunction with the accompanying drawings, in which:

Fig. 3 is a view of a portion of the mechanism at the first operating station, showing one of the spring forming mandrels (the other mandrel being omitted in this and certain following views for clarity), the showing being in schematic fashion to illustrate the mode of operation at the initial stage of the spring forming operation.

Fig. 4 is a view taken similar to Fig. 3 but after the mandrel has commenced its rotation to form the spring.

Fig. 5 is an oblique view at the spring forming mandrel with certain other of the operating instrumentalities illustrated preparatory to engaging the formed coil.

Fig. 6 shows the spring and instrumentalities just prior to the cut off of the wire stock.

Fig. 9 is a view illustrating in schematic fashion the two operating stations and showing the transfer arm approximately mid-way of the two stations and carrying the completed spring from forming station to the assembly mandrels.

Fig. 10 is a view, partly broken away, showing the completed spring positioned between the assembly mandrels and in opened position to receive the advancing woods.

Fig. 11 is a view at the assembly station, one of the mandrels being omitted for clarity, and showing the woods advanced nearly to final position between the spring arms.

Fig. 14 is a timing diagram showing the operating relation of the several instrumentalities.

Fig. 15 is a detail view of the stripping member taken approximately on the line 15—15 of Fig. 2, but at a time when the member is in operating position relative to the transfer arm, the latter being shown in section.

General outline of the machine

Figure 2:
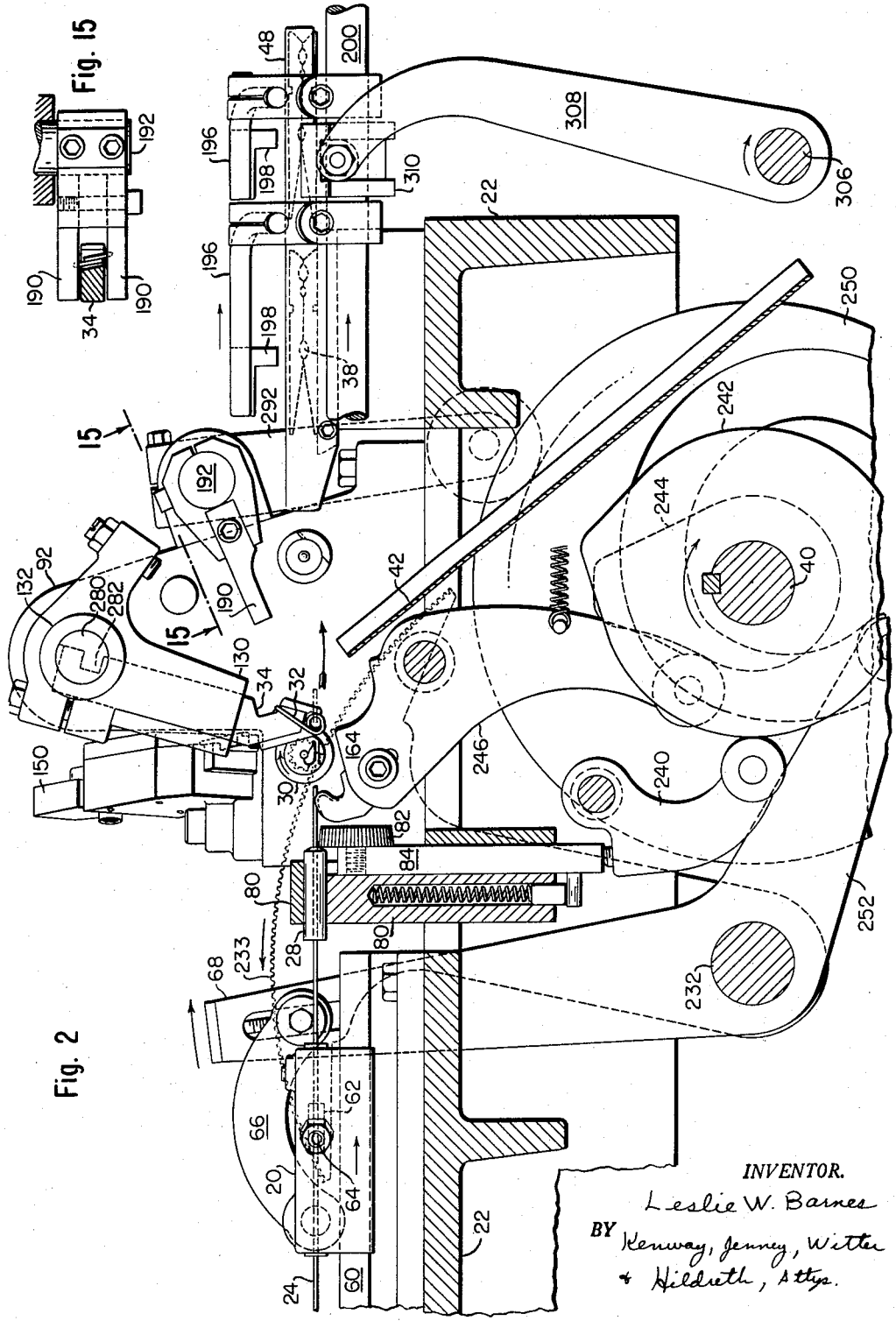
Fig. 2 is a view in sectional elevation taken along the line 2—2 of Fig. 1.

To illustrate the general arrangement and mode of operation of the machine in introductory fashion, reference may be made to Fig. 2 of the drawings which shows the machine in sectional elevation. The main frame of the machine is indicated at 22 as comprising a table or bed which is supported horizontally by means of a suitable frame or legs (not shown) extending downwardly to the base. The wire stock from which the springs are formed is indicated at 24 and is supplied to the machine from the usual spool or reel, not illustrated. The wire is advanced from left to right by feed mechanism 26, hereinafter described in greater detail, through a guide 28 to the first operating station, represented for purposes of this preliminary description by mandrel 30. Through the operation of this mandrel and its complementary device, illustrated in subsequent drawings, the coil spring is formed from the wire stock.

Upon completion of the spring, shown at 32, it is transferred by swinging arm 34 to the second operating station represented by mandrel 36. Here the spring is gripped between cooperating mandrels, one of which counter-rotates to open the spring arms in timed relation to receive the advancing woods 38 which enter the machine at the right hand side and are advanced to the left by appropriate feed mechanism in timed relation to the presentation and preparation of the spring. Operation of the numerous instrumentalities which make up the spring forming and assembling mechanisms is effected by a cam shaft 40 mounted below the horizontal bed 22 of the machine frame. Upon assembly of the spring and the woods at the second operating station, the mandrels separate to release the clothespin which then falls through an opening in the frame 22 into a trough 42 and thence to a bin or onto a conveyor, as desired.

Figure 1:
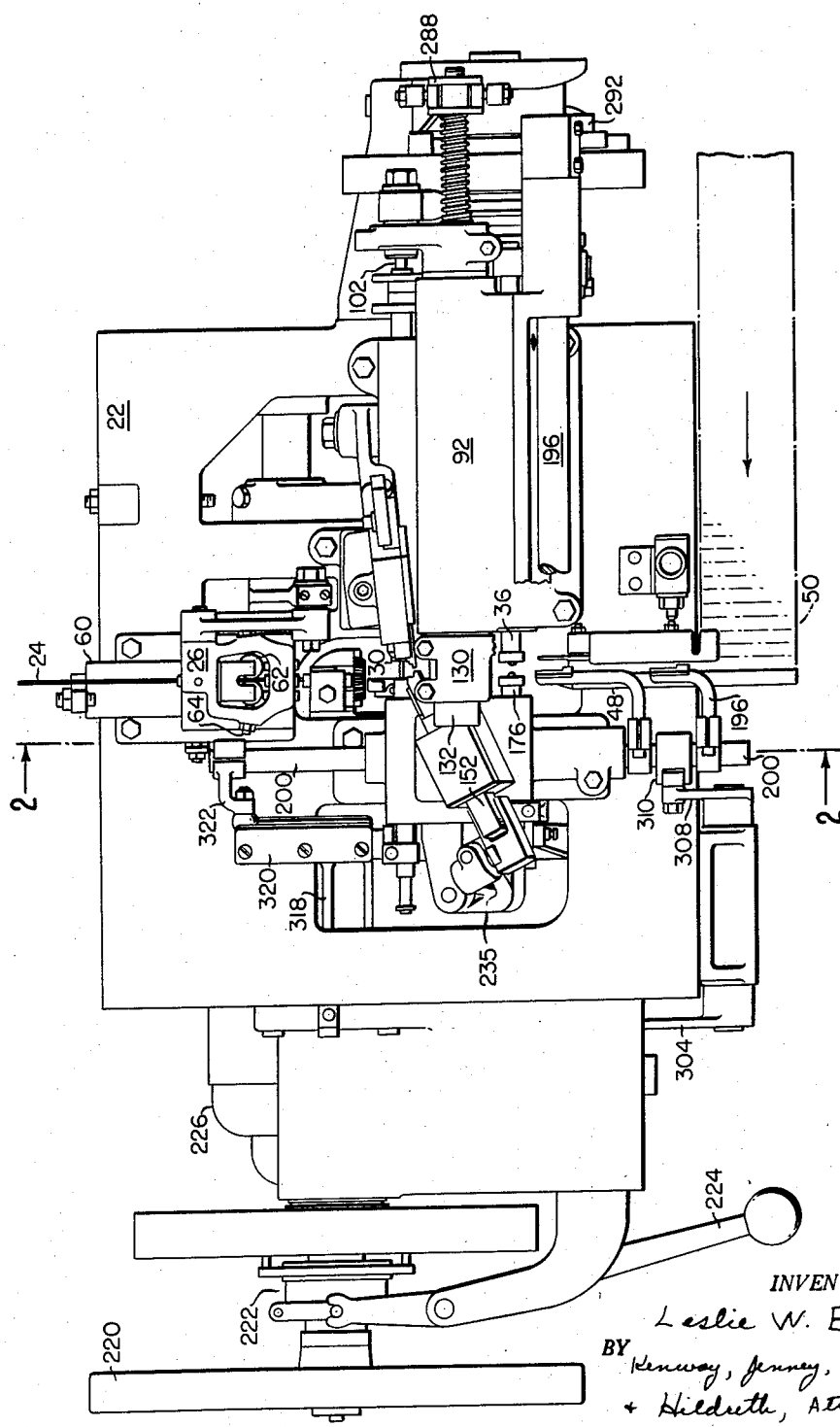
Fig. 1 is a top plan view of the machine.

The general arrangement of the machine is likewise indicated in the plan view, Fig. 1, wherein the spring wire stock 24 enters at the top of the figure, being advanced by reciprocating gripping mechanism 26 to the first operating point at mandrel 30 where the spring is formed. In this figure are seen the mandrels 36, 176 of the assembly point as well as the guideway 48 along which the pairs of woods are advanced to the assembly station. The previously prepared and sorted woods are advanced to the machine by appropriate conveyor means indicated schematically at 50 and are transferred in pairs to the guideway 48 by feed mechanism hereinafter described. Since the pairs of woods are advanced to the guideway by conventional conveyor belt means forming no part of the invention, no detailed showing of such mechanism has been made.

Wire feed mechanism

As has been indicated, a feature of the machine involves the provision of mechanism for forming the coil springs for the clothespin immediately prior to the assembly operation in order that the springs may be accurately presented to the assembly station in predetermined position, instead of attempting to select and position a spring from a random assortment of independently manufactured springs, as from a bin or hopper of such springs. As part of the spring forming operation, the spring stock is supplied to the machine in straight condition from a large reel or spool which may be mounted near the machine on suitable spool holding supports of conventional construction. After passing through the usual sets of straightening rolls, not illustrated, the wire is periodically advanced by a reciprocating feed mechanism 26 supported on a guideway 60 (see Fig. 12). The feed mechanism comprises gripping rolls 62 which are positioned on opposite sides of the wire by means of obliquely inclined studs or screws 64. By reason of these obliquely disposed supporting screws, the rolls are caused to cam or jam against the wire when the feed carriage is reciprocated in feeding direction to supply wire to the spring forming station, and to release their grip on the wire during the winding of the spring and while the feed carriage makes its return stroke. By suitable adjustment of the pivot point of link 66 in the arm 68, the feed mechanism may be arranged to draw off at each stroke exactly the length of wire required for the start of a spring.

Wire cut-off mechanism

After the spring wire stock leaves the feed mechanism, it passes through the guideway 28 which is in the form of a rod of hardened material having a bore or passage for the wire. The guideway 28 is secured in a support 80 (see Fig. 2) mounted on the machine frame 22. The end of the guideway 28 is beveled to provide clearance for a circular cut-off member 82 mounted in the upper end of a support 84. The periphery of this member is provided with a plurality of grooves to afford a multiplicity of shearing positions. By means of connections hereinafter described, the support 84 may be reciprocated vertically to cause the cut-off wheel to shear the wire stock by a cut-off stroke close to the beveled end of the guideway 28, the wire cut-off taking place in accurately timed relation to the spring forming sequence of operations to be described.

The mechanism for forming the clothespin springs

As has previously been indicated, the formation of the springs for the clothespins takes place at the first of the two principal operating stations of the machine, this first station having been designated by the mandrel 30 in the general views, Figs. 1 and 2. The spring forming operation will now be described in detail, with reference to Figs. 3–8 to show the sequence of steps in the operation.

The spring is coiled by means of the rotation of mandrel 30 which is journaled in a bearing in what may be termed the head stock of the machine, such head stock being indicated at 92 in Fig. 1 as bolted to the top base of the frame 22. For purposes of reference, a fragment of the head stock support 92 is indicated as 94 in Fig. 3, it being understood that Figs. 3 through 8 are schematic views in which much of the machine structure has been eliminated in order that the special features of the machine at the operating point may be clearly illustrated.

The mandrel is provided with a central pin 102 of hardened material, this pin being capable of independent axial movement relative to the mandrel. On the end face of the mandrel are two projections, the innner segment 104 being of arcuate configuration while the outer segment 106 has a substantially straight inner face. The clearance between the projections 104 and 106 is just sufficient to allow passage of the wire stock in contact with the end face of the mandrel 30.

When the feed mechanism is reciprocated to advance the wire stock preparatory to the formation of a spring, the end of the wire, under the influence of guideway 28, is directed between the projections 104, 106 to anchor the wire stock to the mandrel. The stroke of the feed mechanism is adjusted to carry the wire beyond the mandrel a sufficient distance to leave a suitable length free to form one arm of the spring. As soon as the wire advance is completed, the mandrel commences to rotate in counterclockwise direction, the pin 102 being advanced outwardly from mandrel 30 to serve as a winding arbor about which the coils are formed.

To aid in the winding of the spring, a second mandrel in the form of a rod 110 (see Figs. 7 and 8) is mounted in axially aligned relation to the winding mandrel 30. The rod 110 at its operating end is provided with a recess into which the end of the pin 102 may project and be supported thereby. The rod 110 is arranged to be axially reciprocated into spring pressed engagement with the wire stock as it is wound on the arbor 102, thereby insuring that the spring end remains seated between the projections 104, 106 and that the coils are wound in tight smooth relation as mandrel 30 rotates.

The rotation of mandrel 30 is continued until approximately seven coils have been wound. Fig. 5 shows the appearance of the spring at the limit of the rotation of mandrel 30 in its counterclockwise direction. It will be observed that the mandrel has moved axially inward of its support 94, the extent of this axial movement being equal to the space taken up by the turns of the coil in order that the wire stock 24 during the winding may lead in a straight line from the guideway 28. The retracting movement of mandrel 30 as well as its rotation and the positioning of the arbor 102, are effected by mechanism hereinafter described.

Also illustrated in Fig. 5 is the offset 112 which occurs in the initial bend of the wire about the projection 104 as a support. This bend 112 is effective in the finished clothespin to position the woods on the spring, the spring at the other end being likewise formed with this offset portion as will be described. The appearance of these offset end portions relative to the clothespin woods may be seen in the partially assembled clothespin of Fig. 11.

The completion of the spring requires the cutting of the wire, the formation of the offset 114 and the in-turning of the straight ends of the spring to form the gripping portions 116, 118 which, in the assembled pin, are received within the usual transverse slots 120 in the clothespin woods 38 (see Figs. 10 and 11).

The completion of the spring is aided by arm 34 which moves into position to provide a support in the nature of an anvil over which the ends of the spring arm may be bent. The arm 34 likewise serves, as has been previously indicated, to carry the completed spring from the forming station to the assembly station. The operation of the arm in carrying out the transfer will be described in a subsequent section.

The arm, only the lower portion of which appears in Figs. 5 through 9, is mounted for radial projection and retraction in a support 130 secured to the end of rock shaft 132 journalled in the upper portion of head stock 92. Radial and swinging movements of the arm 34 are effected by independent actuating mechanisms to be described.

The lower end of the arm 34 carries grooved jaws 136, 138 spaced to embrace the coil portion of the spring. Upon completion of the coil winding, and just prior to cut-off, the arm is actuated to swing over and then drop down onto the coil, the arm being shown at the completion of its swing in Fig. 5 and substantially at the limit of its radial extension in Fig. 6. It will be observed in the figures that the arm is cut away to provide a shelf or sill portion 140, the sill having shallow parallel grooves to receive the in-turned ends of the spring arms.

To form the spring ends, bending members 150 and 152 are actuated along oblique paths to move inwardly into cooperating relation with the arm 34. The left-hand bending member 150 is shown in Fig. 5 prior to its advance downwardly and to the right, while Fig. 6 shows the member in partially advanced position. The operating end of the bending member 150 is provided with a shoulder 154 and an over hanging portion 156. The function of the projecting shoulder 154 is to intercept the end of the spring upon partial reverse rotation of mandrel 30.

The position to which the bending member 150 is advanced during the reverse rotation of mandrel 30 may be described as follows. The shoulder 154 lies to the rear of the surface 160 in the arm 34 a distance substantially the diameter of the wire stock. The forward end 158 of the bending member is spaced laterally from the arm 34 a distance likewise substantially that of the wire diameter. Further, the under surface 156 of the end of the bending member is disposed above the level of the sill 140 by approximately the diameter of the wire stock.

The result of this disposition of the bending member 150 is that the end of the wire is positively intercepted by the shoulder 154 as the mandrel 30 unwinds, thereby placing the end of the wire in position to be bent inwardly over the sill upon further inward movement of the bending member. The cut out in the arm 34 is sufficient to permit insertion of the nose portion 154, 156, 158 of the bending member into the open region.

While the bending member 150 is being moved into position preparatory to the bending of the spring end, the cut-off mechanism 82, 84 is actuated to raise the cut-off disk 82 past the end of the guideway 28 to sever the wire stock. At the same time, an arm 164 having a hooked nose portion 166 is actuated to engage and raise the severed portion of the wire and to wrap it around the end of the right-hand mandrel 110. The end of this mandrel is provided with a projecting portion 168 so that this final convolution of the wire stock has an off-set 114 substantially similar in shape to the off-set 112 resulting from the initial bend around projection 104 of mandrel 30.

While the arm 164 is moving upwardly to bend the severed end of the spring stock around the mandrel 110, the right hand bending member 152 moves obliquely downward towards the arm 134 to intercept and engage the clockwise-rotating end of the spring. To facilitate the interception and engagement of the spring end, the member 152 is provided with a shoulder portion similar to shoulder 154 of the bending member 150, but of the opposite hand. As a result of this shoulder, the wire is positively intercepted at the proper point.

Figure 7:
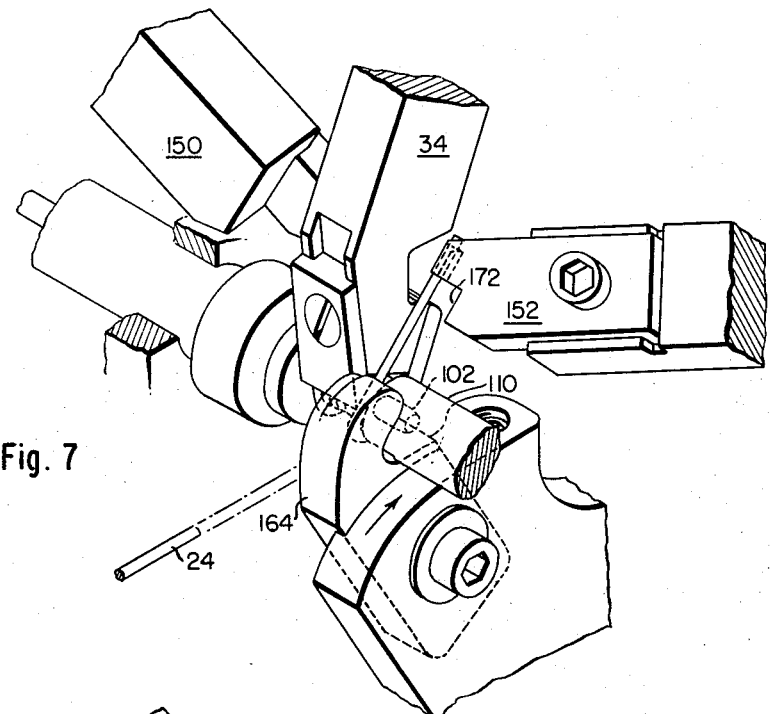
Fig. 7 is another oblique view of the operating instrumentalities at the spring forming station, showing the transfer arm in cooperating position to receive the bending of the spring ends.

By reason of the initial advancing movements of the bending members 150 and 152, the ends of the spring are now positioned on opposite sides of the arm 34 with the ends of the spring opposite the open region above the sill 140. The relative positions of the bending members 150 and 152 are such that the right-hand arm of the spring lies somewhat to the rear of the left-hand spring arm. Fig. 6 shows the left-hand spring arm in a nearly vertical position in dotted outline, while Fig. 7 shows the right-hand spring arm with an appreciable rearward slope.

Figure 8:
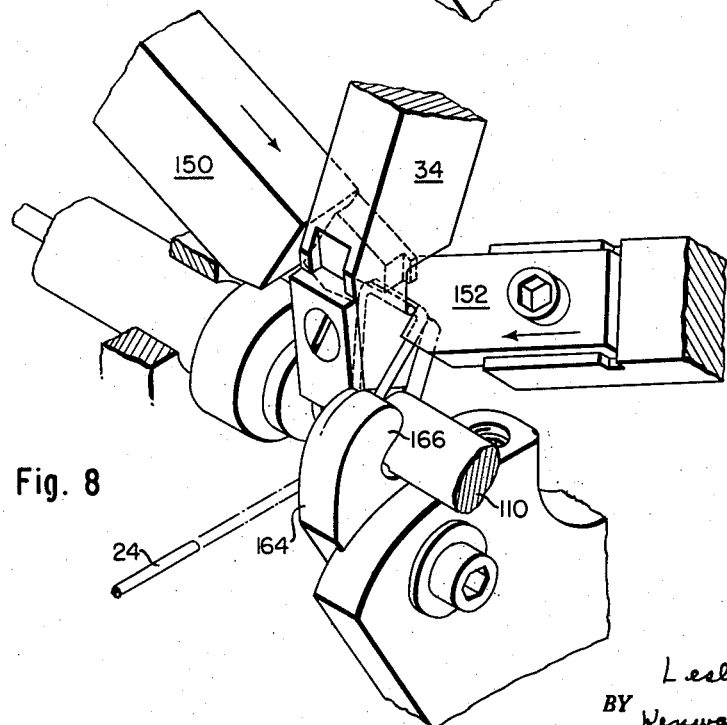
Fig. 8 is a view taken similarly to Fig. 7 following completion of the bending of the spring arms inwardly.

As the next step in the operation, the mandrels 30 and 110, the hook arm 164, and the transfer arm 34 remain in fixed position while the bending members 150 and 152 are moved obliquely inwardly in the direction of the arrows. This results in bending the upstanding arms of the spring inwardly over the sill 140 into closely spaced parallel relation, the in-turned ends being seated in the shallow grooves in the surface of the sill or shelf. Since the bending members have nose portions which do not project beyond the mid-point transversely of the arm 34, the bending operations are able to proceed without interference. During the final portion of the stroke of these bending members, their vertical surfaces 170, 172 press the unbent portions of the spring arms firmly against the sides of the arm 134, thereby insuring the sharp bend for the spring stock. Fig. 7 shows the right-hand portion of the spring immediately prior to the final bending of the spring end, while Fig. 6 shows the left side in dotted outline prior to bending. In Fig. 8, the bending arms have completed their advance and the spring ends now lie on the surface of the sill 140. By reason of the final bending operation on the right hand spring arm around the mandrel 110 following cut-off of the wire stock, substantial spring tension has been imparted to the coil so that the in-turned spring ends are urged toward one another with the requisite force to provide firm gripping action when the spring is assembled on the woods.

*The transfer operation*

The spring is now ready to be transferred from the forming station to the assembly point. For this operation, the arm 34 which has functioned in the manner of a die or anvil during the bending of the spring end, now serves to remove the spring from between the mandrels 30, 110 and to transport the spring to a second set of mandrels 36, 176 constituting the assembly station.

In this transfer operation, the mandrels 30, 110 separate to release the spring, the arbor or rod 102 being withdrawn into the mandrel 30 from the coil of the spring. Upon the release of the spring by the mandrel, the arm 34 is swung into counterclockwise direction by actuation of rock shaft 132 to carry the spring to a position in which the coil is aligned with center points 178 projecting from the end faces of the mandrels 36 and 176. When the arm 34 reaches the limit of its counterclockwise swing, these mandrels move inwardly to engage the spring on the center points 178 to retain the spring while the arm is withdrawn.

The disengagement of the transfer arm 34 from the spring is accomplished by first causing the arm to move outwardly a short distance in its support 130 in order to unseat the in-turned spring ends 116, 118 from the sill of the arm. This radially outward movement of the arm 34 is possible because of the fact that the transfer arm, during the formation of the in-turned ends of the spring, was maintained in slightly raised position relative to the coil so as to leave clearance between the lower end of the arm and the coil (see Fig. 6). Upon the radial outward or downward movement of the transfer arm relative to the supported spring, the inturned spring ends are separated from the shallow grooves in the sill.

The spring is then rotated to carry the arms out of the notch in the transfer arm in order that the arm may be raised as part of the releasing sequence. To rock the spring in a clockwise direction for this purpose, and thereafter to open the spring ends for insertion of the woods, the mandrels 36, 176 are provided with collars 180 having notched shoulders 182, 184 on the opposing edges of the collars. To rock the spring out of the transfer arm, the mandrel 176 is rotated in clockwise direction, causing notch 184 to engage the spring arm and forcibly rock the spring. This rocking movement of the spring carries the other spring arm into engagement with the shoulder 182 on the left-hand mandrel 36, as shown in Fig. 10, thereby halting further rotation of this end of the spring as mandrel 176 continues its rotation.

With the spring now held by the assembly mandrels and with the spring ends entirely free of the arm 34, the arm may readily be withdrawn radially into its housing 130 so as to release the jaws 136, 138 from the coil. As soon as the jaws clear the spring, the arm is actuated to rock to the left, preparatory to moving into position over a partially completed spring at the spring forming station, as previously described.

To insure removal of a completed spring from the transfer arm before it returns to the spring forming station, in the event the mandrels 36, 176 should fail to remove the transferred spring from the arm, means are provided for cutting free such improperly retained spring. Such means appears in Fig. 2 as an arm 190 having portions which embrace each side of the transfer arm 34 above the notch and in-turned wire ends when the arm has swung to the assembly station. Upon the commencement of the return stroke of the transfer arm, the stripping arms 190 move downwardly by suitably timed rotation of rock shaft 192. This downward movement of the arms 190 results in a shearing action past the sill in the transfer arm, effectively cutting off the in-turned spring ends if by chance a spring is caught or otherwise improperly retained on said arm. By cutting off such improperly retained spring, the arm is effectively cleared of the spring prior to its return to the spring forming station, thereby preventing damage to the spring forming instrumentalities. While such improper retention of a spring on the transfer arm occurs relatively infrequently, the operation of the stripping arms 190 is desirable to insure continued operation of the machine automatically for sustained periods of operation. The timed relation of the return stroke of transfer arm and the downward stripping movement of the arms 190 is such that the arms move past the transfer arm 34 without interference with the operation of said arm during the normal operation of the machine when the completed spring has been transferred to the assembly mandrels.

*The assembly operation*

At the time the clothespin spring is being positioned on the assembly mandrels and the spring opened to the position shown in Fig. 10, the pairs of clothespin woods 38 are being advanced along the guideway 48 toward the assembly point (see Fig. 2). The feed of the woods is effected by arms 196 having downwardly extending lugs 198. The arms 196 are mounted on a shaft 200 which is given timed rotary and axial movements to impart a four-way motion to the feed lugs 198, thereby advancing the pairs of wood in stepwise fashion to the assembly point.

The position of the woods as they approach the opened spring is illustrated in Fig. 10, which shows the spring arms separated sufficiently to permit the passage of the ends of the woods. Upon further advance of the woods between the spring arms, the woods pass above and below the spring as shown in Fig. 11. With the final advance of the woods, the spring arms 116, 118 snap into the slots 120 while the coil portion of the spring seats itself in the grooves 202.

Upon the completion of the assembly operation, the mandrels separate, releasing the spring and allowing the clothespin to fall into chute 42 and through the opening in the bed 22 to a bin or onto a conveyor, as previously indicated.

During the assembly operation at the mandrels 36, 176, the spring forming operation has been taking place at the first operating station. As a result, the separation of the assembly mandrels, together with the rotation of mandrel 176 in counterclockwise direction, prepares these mandrels to receive the formed spring from the advancing transfer arm 34. Accordingly, the sequence of operations takes place rapidly, insuring a high rate of production.

*Actuating connections for the spring forming mechanism*

The several instrumentalities of the spring-forming mechanism, as well as the mechanisms at the assembly station, are actuated from a single cam shaft 40 extending from front to back of the machine or, as viewed in Fig. 1, from left to right. At its front end, the cam shaft is provided with a hand wheel 220 which likewise serves as a flywheel. The cam shaft is motor driven in accordance with usual practice, there being start and stop mechanism 222 under the control of a hand lever 224. The reduction drive from the motor 226 is illustrated in part by the gears 228, 230 in Fig. 12.

Figure 12:
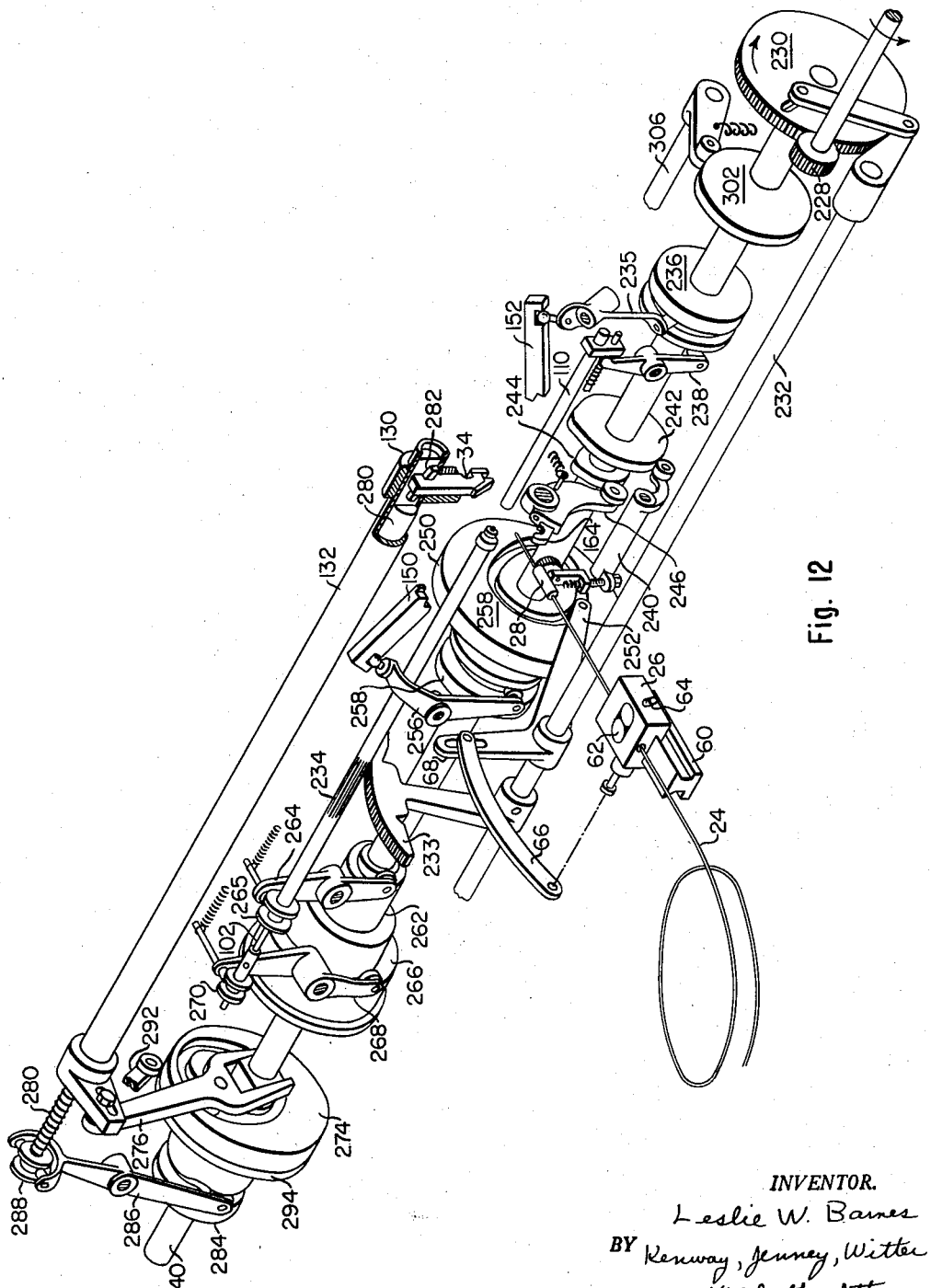
Fig. 12 is an oblique view showing the main cam shaft and the operating connections from the cam shaft to the spring forming mechanisms of the first operating station.

Fig. 12, it should be noted, shows the actuating connections from cam shaft 40 for operating the wire feed, the wire cut-off, the spring forming mandrels and bending members and the transfer arm. While the several instrumentalities of the assembly station are likewise driven from the same cam shaft 40, these connections are shown in a separate view, Fig. 13 in order to avoid the multiplicity of parts that would result if all connections were illustrated in a single figure.

The rotation of the spring-forming mandrel 30 is effected by rock shaft 232 through link and crank pin connections from gear 230. The rock shaft has gear sector 233 secured thereto which meshes with an elongated pinion 234 on mandrel 30.

The bending member 152 for the righthand spring end is reciprocated by a ball and slot connection from a pivotally mounted rock arm 235 which in turn is actuated by axial cam 236. The pivotal axis of arm 235 is obliquely inclined at a compound angle relative to the coordinates of the machine in view of the oblique operating axis of the bending member 152.

To effect the withdrawing movement of the clamping mandrel 110 upon completion of a formed spring, the cam 236 is provided with a second cam surface on its inner end which actuates a rock arm 238, the upper end of which bears against a block secured to the end of rod 110.

The actuation of the wire cut-off mechanism is effected by a rock shaft 240 from radial cam 242. The bending arm 164 for the righthand spring off-set is rocked by a smaller radial cam 244 to the rear of cam 242, the arm 164 being clamped in a pivotally mounted support 246 having a cam follower at its lower end.

The actuation of the wire feed mechanism 26 is effected by a cam 250 and lever 252, the latter being integrally formed with the slotted arm 68 to which link 66 is adjustably pivoted as hereinbefore described. The arm 68, 252, is pivoted on rock shaft 232 in order to provide a convenient bearing point.

The reciprocation of the bending member 150 on the far side of the operating point is effected by a rock arm 256 and axial cam 258, appropriate ball and slot connections being utilized between arm 256 and member 150 to permit the requisite pivotal movement of the parts.

In addition to the rotation of mandrel 30 by the connections from gear 230, rock shaft 232 and sector 233, the mandrel is given an axially reciprocating movement by axial cam 262, rock arm 264, and flanges 265. It will be observed that the pinion 234 on mandrel 30 which meshes with sector 233 is elongated to maintain the driving connections for rotary movement throughout the axial reciprocation of said mandrel.

The axial projection and withdrawing of the arbor 102 within mandrel 30 is likewise effected by an axial cam 266 and rock arm 268, the arbor 102 extending beyond the far end of the mandrel and being provided at its end with suitable flanges 270 to provide the axial connection while permitting free rotary movement, these connections being similar to those employed for the mandrel 30.

The rocking movement of transfer arm 34 is derived from closed-track cam 274 and a cam lever 276 of the scotch yoke type. The rock shaft 132 and housing 130 of the transfer arm have previously been described.

The retracting and extending movement of the transfer arm 34 within its support is accomplished by a central shaft 280 within the rock shaft 132. This arm is provided with an oblique key portion 282 which engages a slot in the upper end of the transfer arm. Upon axial movement of the central shaft 280 within the rock shaft 132, the oblique key 282 causes the arm to project and withdraw relative to its housing 130. This axial movement of shaft 280 is effected by axial cam 284 and lever 286, the latter making connection to the shaft 280 by a yoke and flange connection 288.

The rocking movement of the stripper arm 190 (Fig. 2) is provided by cam lever 292 at the rear end of rock shaft 192, the cam lever being rocked by cam 294. A portion of the cam lever 292 appears in Fig. 12.

*Actuating connections for the assembly mechanism and the wood feed mechanism*

Figure 13:
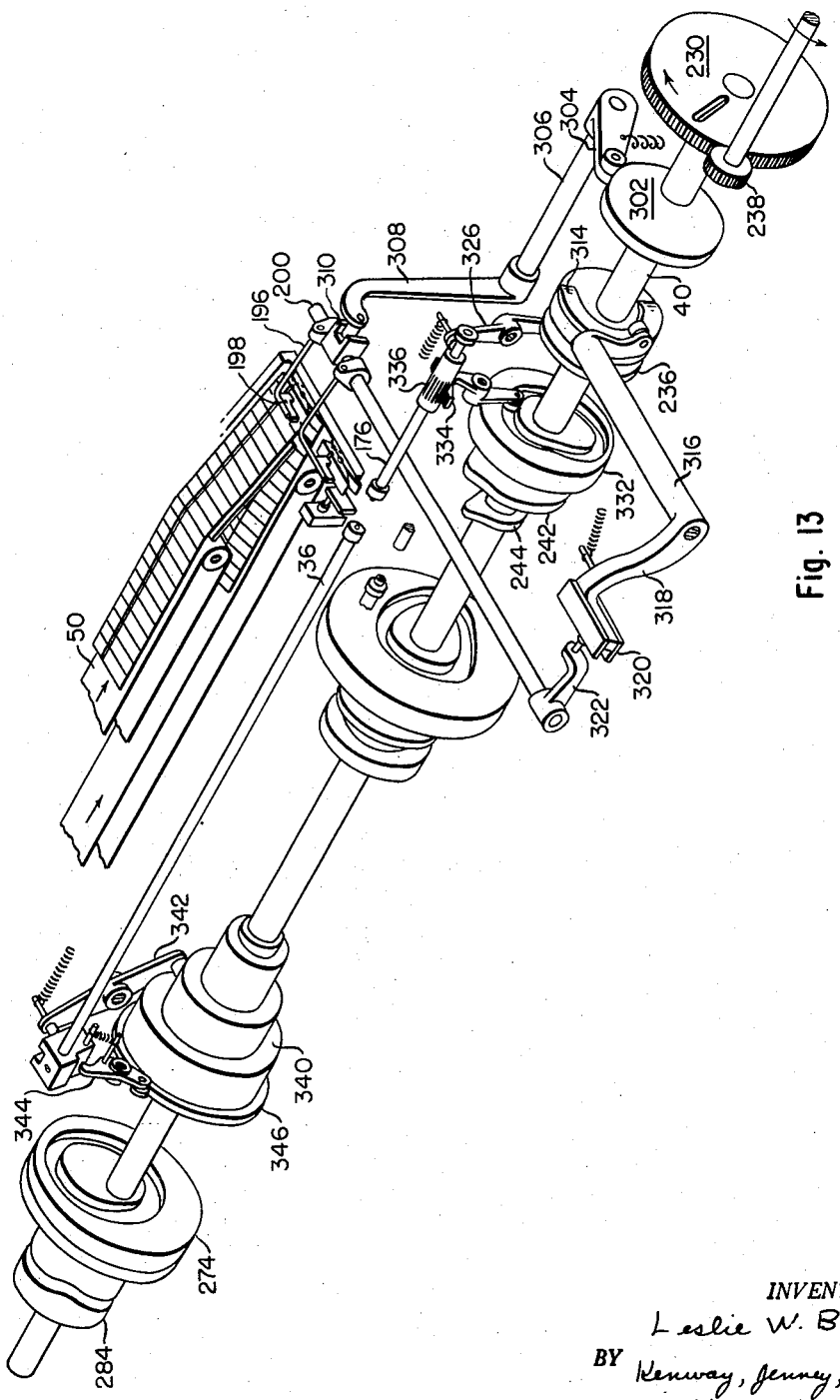
Fig. 13 is an oblique view of the main cam shaft, showing the operating instrumentalities and connections for the second operating station.

Fig. 13 shows the operating connections from the main cam shaft 40 of the machine to the assembly mandrels 36, 176 and to the feeding fingers 198 by which the clothespin woods are advanced to the assembly point. These feed fingers, as has already been indicated, are subjected to a four-way motion to advance the pairs of woods stepwise into the machine.

The feeding movement is imparted by means of cam 302, cam lever 304, rock shaft 306 and arm 308. The upper end of arm 308 connects to the supporting shaft 200 of the feed fingers by means of a roller and block connection indicated at 310 to permit rocking movement of the shaft 200 during axial reciprocation.

Rocking movement of shaft 200 to raise and lower the feed fingers 198 out of and into engagement with the clothespin woods is effected by a cam surface 314 on the end of cam 236. A rock shaft 316 having an arm 318 provided with a slide way 320 serves to rock the arm 322 on shaft 200 while permitting axial sliding movement of said shaft.

Axial movement of the front assembly mandrel 176 is effected by rock arm 326 from an axial cam on the inner face of cam 236. Rotation of said mandrel to swing the spring down from the transfer arm and open the spring arms preparatory to receiving the woods is effected by cam 332 which rocks gear sector 334 and elongated pinion 336 secured to the mandrel.

The other mandrel 36 is reciprocated by axial cam 340 through rock arm 342, while the slight rocking movement required to release the spring as the assembly operation proceeds is afforded by small rock arm 344 having a cam follower which runs on the periphery of cam disk 346.

*Timing of the operations*

The timing of the various spring forming, transferring and assembly operations is illustrated in the chart, Fig. 14 wherein various instrumentalities are tabulated at the left of the chart, the reference characters of the instrumentalities being appended for ease in identification. The timing is given in terms of cam shaft rotation. For convenience in description, the operations which take place during quarter revolutions of the cam shaft will be treated together in order to show the coordination of the various operating instrumentalities.

During the period of rotation zero–90 degrees, the wire feed mechanism 26 carries the wire into engagement with the operating mandrel 30, this mandrel returning to its unwound position preparatory to starting a new spring. Also during this interval the spring winding mandrel 30 has moved forwardly to bring its operating face in alignment with the advancing wire from the feed mechanism. The winding mandrel arbor 102 is likewise caused to project, and at the end of the 90 degree rotation of the cam shaft the clamp mandrel 110 moves inwardly against the winding mandrel to support the arbor and retain the spring end in place as the winding commences.

During this period of preparation for winding a spring, the transfer arm 34 has been moving from the spring forming station towards the assembly station, carrying a completed spring. At approximately the 60 degree point in the cam shaft rotation, the assembly mandrels or spindles 36, 176 are caused to project towards one another to grip the coil portion of the spring, following which the transfer arm 34 makes its slight further projection to release the in-turned ends of the spring arm from the sill 140 on the transfer arm.

In the bottom portion of Fig. 14 the vertical and horizontal motions of the wood feed fingers 198 is illustrated. Following retraction horizontally, the feed fingers are moved downward into engaging position with the woods, following which the feed starts its horizontal motion to the left which culminates in bringing the pairs of woods into position between the spring arms.

During this first 90 degree period the spring stripper arm 190 remains in retracted position, substantially as appears in Fig. 2 of the drawings.

During the second 90 degree rotation of the cam shaft, the wire feed mechanism makes the major portion of its return stroke. The winding of the mandrel 30 proceeds while the mandrel is retracted to accommodate the build up of the turns of the spring coil, the clamping mandrel 110 remaining in fixed position at the front of the spring as the winding proceeds. It will be noted that the bending members 150, 152 remain in retracted position, as does the wire cut-off mechanism 82 and the hook arm 164.

The transfer arm 34, having left the completed spring in clamped position between the assembly spindles 36, 176, makes a relatively rapid retracting movement to its housing 130 so as to clear the spring, after which the arm is rocked in return direction towards the spring forming station.

Before the transfer arm can start its radially retracting movement into the housing 130, the completed spring must be swung from the transfer arm by rotating the spring arm in a clockwise direction. This is accomplished by rotation of the front assembly spindle 176 as appears from the timing curve for that instrumentality.

During the first portion of the return swing of the transfer arm, the spring stripping arm 190 makes its downward sweep past the sides of the transfer arm so as to shear off the in-turned ends of the spring arms and free the spring if by chance the completed spring has not been properly transferred to the assembly mandrels or spindles. The stripper arm 190 then starts its return to its raised position.

During the rotation of cam shaft 40 through its third quadrant, 180°–270° the winding of the spring is completed and the wire cut-off mechanism 82 actuated to sever the wire stock. Also, the rear bending member 150 makes its preliminary outward movement, just far enough to be in position to engage the rear spring arm as the mandrel 30 unwinds through a portion of a revolution.

During this period the hook arm 164 begins its motion into operative position to perform the bending of the front or right-hand side of the machine around projection 168.

Also during this period, the transfer arm has moved into position over the completed coil of the spring, after which the arm moves radially outward so that its jaws may embrace the spring coil. It will be observed that the arm does not project to the limit of its motion, such projection being reserved for the brief interval when the spring is to be disengaged from the transfer arm at the assembly station, as previously described.

At the assembly station, the spring is positioned with its arms separated while the woods are advanced. After the woods have entered the spring arms, the rear assembly spindle 36 rotates in a clockwise direction to allow the upper arm to ride on the top wood, thereby insuring that the spring ends will snap into the grooves 120.

With the completion of the advance of the woods into the spring, the feed fingers 198 start their vertical raising movement to disengage from the woods. Also, the assembly mandrels or spindles 36, 176 retract to release the assembled clothespin and allow it to fall into the chute below.

During the final quadrant of cam shaft rotation, the bending members 150, 152 perform their operations of bending the ends of the spring inwardly over the sill 140 in the transfer arm 34. This operation takes place by a quick projection, followed immediately by retraction as shown in the timing curves. During this bending operation, the wire feed has started to bring a new length of wire towards the operating mandrel 30 which has further retracted from the spring in order that it may carry out its unwinding or clockwise rotation preparatory to a new spring winding operation. Likewise, the clamp mandrel 110 retracts to release the righthand end of the spring, the hook arm 164 also retracting after completing the bending of the spring arm with its offset 114.

The retraction of the spring assembly spindles, which commenced at the end of the previous quadrant, is completed, and the spindles rotate back to position preparatory to receiving the next spring. The feed fingers, now disengaged from the woods, retract horizontally to the right to pick up the next pair of woods.

As a result of the above described sequence of operations, it is possible for the spring forming operation to take place at the first operating station while the assembly operating is taking place with a previously formed spring at the assembly station. The transfer takes place smoothly and rapidly so that the production rate may be maintained at a high level. As a result of employing the transfer mechanism, it is possible to provide a spring forming station wherein the instrumentalities are concerned only with the formation of the spring in optimum fashion, while the assembly station is likewise constructed and adapted to perform the assembly of the woods and the spring most effectively and without interference from the spring forming instrumentalities.

While the invention has been illustrated and described as embodied in a particular machine, it will be understood that the novel method may be performed by other instrumentalities and that the apparatus may be subject to modifications in construction and arrangement within the scope of the appended claims.

Having thus described my invention, I claim:

1. A machine for making spring clip clothespins comprising a spring forming station having operating instrumentalities for forming a spring from wire stock, said instrumentalities comprising cooperating mandrels between which the spring coil is formed and an arm having a surface over which the spring ends are bent, one of said mandrels having projecting means for engaging the wire stock to wind the spring upon rotation of the mandrel, an arbor within said mandrel on which the spring is wound, means for severing the wire stock on completion of the winding, the arm for supporting the spring for in-bending of the spring ends having spaced jaws, means for positioning the arm intermediate the spring ends, with the jaws embracing the coil portion of the spring, bending members disposed on oblique axes for inward movement toward said surface on the arm, means for actuating said bending members to turn the spring ends into contiguous parallel relation on the surface of the arm, means for actuating said arm to carry the formed spring to the assembly station for assembly with a pair of woods, said assembly station having cooperating mandrels to engage the spring and open the spring arms to receive the woods, means for extending the arm upon engagement by the spring by the assembly mandrels to release the in-turned spring ends from the adjacent surface of the arm and for thereafter retracting the arm to release the jaws from the body of the spring, and means for actuating one of the assembly mandrels to rotate the spring to remove the in-turned spring ends from the arm while the arm is extended.

2. A machine for making spring clip clothespins comprising a spring forming station having operating instrumentalities for forming a spring from wire stock, said instrumentalities comprising cooperating mandrels between which the spring coil is formed, one of said mandrels having projecting means for engaging the wire stock to wind the spring upon rotation of the mandrel, said projecting means being shaped to produce a substantial offset in the portion of the spring adjacent the first coil, an arbor within said mandrel on which the spring coil is wound, means for severing the wire stock on completion of the winding, the other cooperating mandrel having a projection over which the severed wire is bent to produce an offset in the portion of spring adjacent the last coil, means for bending said severed end over the projection, and means for supporting the spring for in-bending of the spring ends, said means comprising an arm having spaced jaws, means for positioning the arm intermediate the spring ends with the jaws embracing the coil, a surface on said arm over which the ends are bent, bending members disposed on oblique axes for inward movement toward said surface on the arm, means for actuating said bending members to turn the spring ends into contiguous parallel relation on said surface of the arm, means for actuating said arm to carry the formed spring to the assembly station for assembly with a pair of woods, means at said assembly station for positioning and opening the transferred spring, and means for advancing a pair of woods into the opened spring.

3. A machine for making spring clip clothespins comprising a spring forming station having operating instrumentalities for forming a spring from wire stock, said instrumentalities comprising cooperating mandrels between which the spring coil is formed and an arm having a surface over which the spring ends are bent, said arm being mounted for swinging and radial movements, means for actuating said instrumentalities to form a spring at the forming station including the bending of the spring ends over the surface of the arm, an assembly station having instrumentalities for engaging and opening a formed spring, means for advancing woods into the opened spring, and means for actuating the arm to transfer a formed spring from the forming station to the assembly station, connections for causing said arm to move radially outward when the spring has been gripped by the engaging instrumentalities at the assembly station, thereby to release the spring ends from the surface of the arm, and thereafter to retract radially from the spring and swing back to the forming station, and stripping means actuated to move into shearing position alongside the transfer arm on the return swing of said arm from the assembly to the forming station to remove from said arm any spring improperly retained on said arm.

4. In a machine for making spring clip clothespins having a pair of clamping members and a spring having coils with arms having inturned ends, spring forming apparatus having operating instrumentalities for forming a spring from wire stock, comprising a pair of aligned co-operating mandrels between which the spring is formed, one of said mandrels having a retractable arbor upon which the wire is wound, means for supporting the spring for inbending of the arm ends, said means comprising an arm having spaced coil-embracing jaws and anvil surface spaced therefrom, means for actuating the arm to position the jaws over the spring coils, bending members disposed on oblique axes on each side of the arm for inward movement toward the anvil surface, and means for actuating the bending members to turn the spring ends into contiguous parallel relation on the said surface of the arm.

5. In a machine for making spring clip clothespins having a pair of clamping members and a spring having coils with arms having inturned ends, spring forming apparatus having operating instrumentalities for forming a spring from wire stock, comprising a pair of aligned co-operating mandrels between which the spring is formed, one of said mandrels having a wire anchoring abutment and a retractable coaxial mandrel over which the wire is wound, means operative on completion of the winding to sever the wire at a point spaced from the wound coil by the length of the spring arm and inturned end to be formed, means for supporting the spring for inbending of the arm ends, said means comprising an arm having spaced coil-embracing jaws and an anvil surface spaced therefrom, means for actuating the arm to position the jaws over the spring coils, means for rotating the severed end of the spring to position the stock alongside the arm adjacent the edge of the anvil surface thereof, bending members disposed on oblique axes on each side of the arm for inward movement toward the anvil surface, and means for actuating the bending members to turn the spring ends into contiguous parallel relation on the said surface of the arm.

6. In a machine for making spring clip clothespins having a pair of clamping members and a spring having coils with arms having inturned ends, means for transferring a completed spring to an assembly station for assembly with the clamping members comprising a transfer arm having spaced coil-engaging jaws and a surface over which the inturned spring ends are disposed, said arm being mounted for swinging and radial movements, means for swinging the arm to a position in which the spring is aligned for engagement by spring-engaging instrumentalities, and means operative after engagement of the spring by said instrumentalities for withdrawing the transfer arm radially from the spring to disengage the jaws of the arm.

7. In a machine for making spring clip clothespins having a pair of clamping members and a spring having coils with arms having inturned ends, spring transfer mechanism comprising an arm mounted for arcuate swinging and radial movements to transfer a completed spring in predetermined position from a spring making station to an assembly station, said arm having spaced jaws between which the spring coils are disposed and a surface spaced from said jaws over which the spring ends are inturned, means for actuating the arm to carry the formed spring to the assembly station, said station having rotatable spring engaging instrumentalities to rotate the spring bodily to remove the inturned ends from the transfer arm, and means thereafter operative to retract the arm radially to disengage the jaws thereof from the spring coils.

8. In a machine for assembling spring clip clothespins from a pair of clamping members and a spring having coils and arms having inturned ends, an assembly station comprising a pair of cooperating rotatable mandrels, abutments on said mandrels to engage the spring arms, means for actuating the mandrels to engage a spring and relatively rotate the arms thereof to separate the inturned ends, and means for advancing a pair of clamping members between the inturned ends and the coils while the spring is held by the mandrels.

9. In a machine for assembling spring clip clothespins from a pair of clamping members and a spring having coils and arms having inturned ends, an assembly station comprising a pair of cooperating relatively rotatable mandrels having abutments for engaging the spring arms, means for presenting a spring to said mandrels comprising a transfer arm having spaced coil-engaging jaws and a surface over which the inturned spring ends are disposed, means for rotating the mandrels to rotate the spring to disengage the spring ends from the transfer arm and to open the spring to separate said ends, means for withdrawing the transfer arm, and means for advancing a pair of clamping members between the separated ends of the spring while the spring is held by the mandrels.

10. In a machine for assembling spring clip clothespins from a pair of clamping members and a spring having coils and arms having inturned ends, an assembly station comprising a pair of aligned axially movable and relatively rotatable mandrels having abutments to engage the spring arms, means for presenting a spring to the mandrels comprising a transfer arm having spaced coil-engaging jaws and a surface over which the inturned spring ends are disposed, means for actuating the transfer arm to position the spring coils in axial alignment with the mandrel axes, means for actuating the mandrels axially and rotatably to engage and bodily rotate the spring to disengage the inturned spring ends from the transfer arm and thereafter to separate the inturned ends, means for withdrawing the transfer arm from the spring, means for advancing a pair of clothespin clamping members between the separated inturned ends of the spring while the spring is held by the mandrels, and thereafter separating the mandrels to release the assembled clothespin.

References Cited in the file of this patent

UNITED STATES PATENTS

| | | |
|---|---|---|
| 1,829,651 | Henderson | Oct. 27, 1931 |
| 1,830,021 | Forney | Nov. 3, 1931 |
| 2,192,260 | Fisher | Mar. 5, 1940 |
| 2,515,308 | Lindham | July 18, 1950 |
| 2,631,359 | Schwartz | Mar. 17, 1953 |
| 2,705,027 | Sanborn | Mar. 29, 1955 |
| 2,746,491 | Forney | May 22, 1956 |